UNITED STATES PATENT OFFICE.

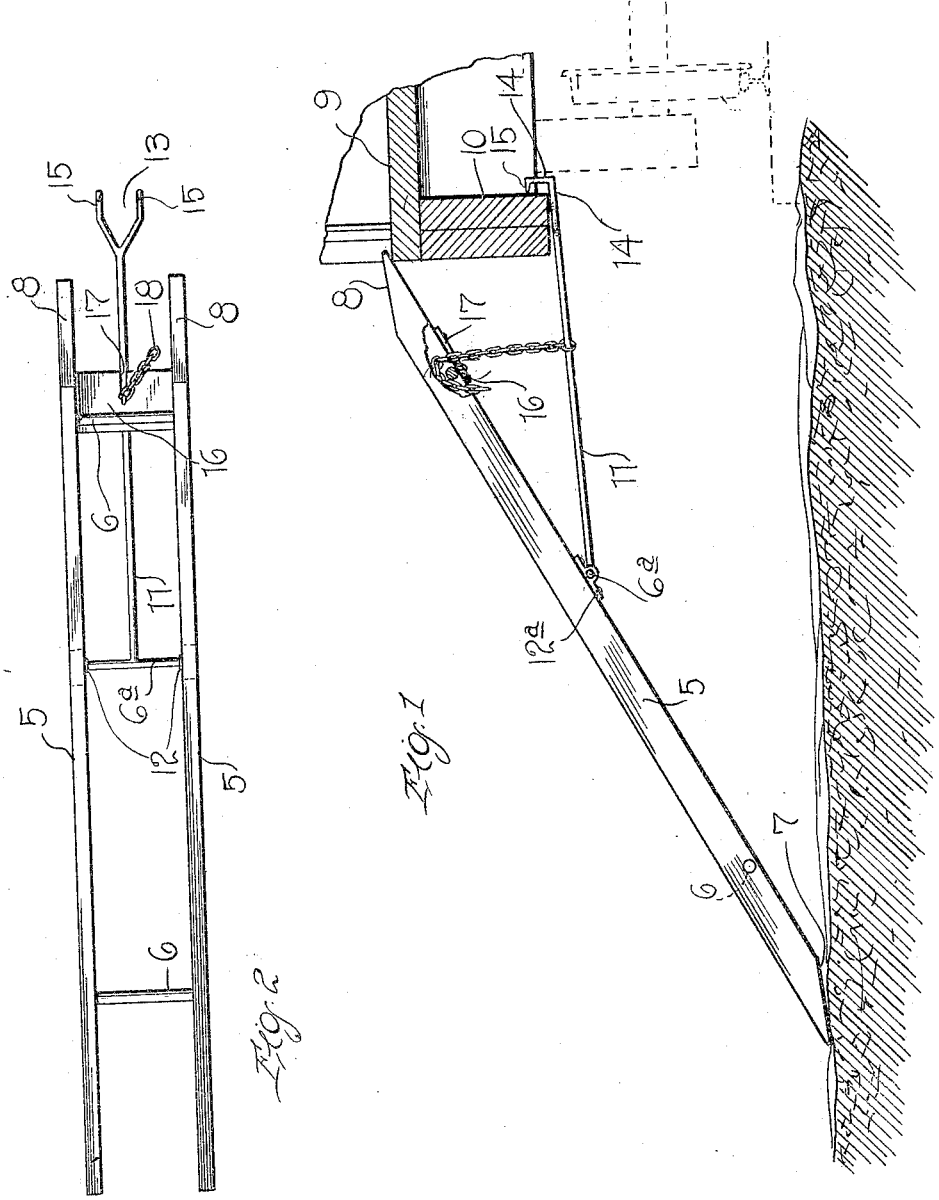

ERIC W. NISWANGER, OF HEWINS, KANSAS.

SKID.

1,103,155.    Specification of Letters Patent.    Patented July 14, 1914.

Application filed February 14, 1914. Serial No. 818,780.

*To all whom it may concern:*

Be it known that I, ERIC W. NISWANGER, a citizen of the United States, residing at Hewins, in the county of Chautauqua and State of Kansas, have invented certain new and useful Improvements in Skids, of which the following is a specification, reference being had to the accompanying drawings.

This invention relates to new and useful improvements in skid members for loading and unloading cars or the like, and is particularly directed to means for holding the skid in position.

In loading or unloading such vehicles as cars and the like, where heavy objects are handled, a skid is used, which rests at one end on the bottom of the car and at its other end on the ground. The skid member is thus likely to have its free end forced from the car and allow the skid to drop with the danger of damage to the articles handled and personal injury to the operator.

It is therefore the object of the present invention to provide means associated with an ordinary skid whereby when it is positioned with relation to a car, said means may be readily actuated to hold the skid securely in proper position.

A further object of the invention resides in the provision of such a device which may be associated with any skid and which comprises a minimum number of parts, so that it may be manufactured at comparatively low cost.

With these and other objects in view, this invention consists in certain constructions, arrangements and proportions of the parts that I shall hereinafter more fully describe and claim.

For a full understanding of the invention, reference is to be had to the following description and accompanying drawing, in which—

Figure 1 is a side elevation, partly in section, of a skid applied to the door of a freight car, and having associated therewith the improved means for preventing accidental displacement of said skid. Fig. 2 is a top plan view of the skid with the improved means associated therewith.

Referring more particularly to the accompanying drawing, an ordinary skid is shown which comprises the relatively heavy side rails 5 connected at spaced intervals by the rungs 6. The lower ends 7 of the rails are beveled to properly engage the ground when the skid is raised, and the upper ends 8 of the rails are beveled opposite to their lower ends to facilitate moving an object on to the skid. In Fig. 1 the skid is shown in conjunction with a railroad car, comprising a bottom 9 from which depend longitudinal sills 10.

The means for holding the skid against sliding off of the bottom of the car consists in part of a rod 11 which has formed preferably integral with it at one end a cross bar 6ª which constitutes one of the intermediate rungs. This bar is provided near its ends with shoulders 12, the extremities beyond the shoulders being adapted to fit in bearings formed by plates 12ª that are secured by screws or similar fastening devices to the side rails 5 of the skid, as clearly illustrated in Fig. 1. The other end of the rod 11 is provided with a fork 13 and the free extremities of the arms of said fork are bent at right angles, as indicated at 14, to the bore 6ª and thence inwardly to provide teeth 15 that lie parallel with the arms. This fork is adapted to be disposed under one of the sills 10 of the car with its teeth in engagement with said sills. To hold the rod against dropping, a transverse plate 16 is secured to the bottom faces of the rails adjacent to their upper ends, and this plate is provided with an open-ended slot 17. A chain 18 has one end link engaged with the rod and its other end secured to the rung 6 adjacent the plate, and is adapted to have a selected one of its links engaged in the slot to thus lock the chain against movement.

In the operation of the device, the skid is placed in position with its upper end resting on the car floor, the rod 11 is then positioned with its teeth engaging the inner face of one of the sills, and the chain is drawn up so that the rod is held tightly against the bottom of the sill, one of the links of the chain being then engaged in the slot 18 to hold the parts in this relation. Thus it is seen that the skid is securely held against sliding from the bottom of the car and falling.

What is claimed, is:

1. The combination with a skid, of a rod pivoted thereto and terminating in a toothed portion adapted to engage the under surface of an object to which the skid is attached, and adjustable means for holding said toothed portion in engagement to prevent sliding of the skid.

2. The combination with a skid including transverse rungs, of a rod rigid with one of said rungs and adapted to extend under the object to which the skid is adapted to be attached to prevent sliding movement of the skid, a flexible connection secured to said rod, and means engaging said flexible connection to hold the rod in engaging relation.

3. The combination with a skid including transverse rungs, of a rod rigid with one of the rungs and adapted to extend under the object to which the skid may be attached to engage said object to prevent sliding movement of the skid, a plate secured transversely of the skid and provided with an open-ended slot, and a chain having one end secured to the rod and adapted to selectively have one of its links engaged in the slot to thus hold the rod in position.

4. The combination with a skid, of a rod disposed longitudinally underneath of the same, a rung to which one end of the rod is connected, said rung being pivotally mounted at its ends to the rails of the skid, said rod being adapted to extend underneath the object to which the skid may be attached and formed with teeth for engaging said object, a plate secured transversely of the skid and provided with an open-ended slot, and a chain having one end secured to the rod and adapted to have one of its links engaged in said slot to thus hold the rod in position.

In testimony whereof I hereunto affix my signature in the presence of two witnesses.

ERIC W. NISWANGER.

Witnesses:
C. J. BURSON,
LORA AKIN.

---

Copies of this patent may be obtained for five cents each, by addressing the "Commissioner of Patents, Washington, D. C."